US010985835B2

(12) United States Patent
Zheng et al.

(10) Patent No.: US 10,985,835 B2
(45) Date of Patent: Apr. 20, 2021

(54) DEVICES, METHODS, AND SYSTEMS FOR UPLINK SYNCHRONIZATION IN TIME DIVISION MULTIPLE ACCESS (TDMA) SATELLITE NETWORK

(71) Applicant: ATC Technologies, LLC, Reston, VA (US)

(72) Inventors: Dunmin Zheng, Vienna, VA (US); Santanu Dutta, Vienna, VA (US); Gary Churan, Annandale, VA (US)

(73) Assignee: ATC TECHNOLOGIES, LLC, Reston, VA (US)

( * ) Notice: Subject to any disclaimer, the term of this patent is extended or adjusted under 35 U.S.C. 154(b) by 0 days.

(21) Appl. No.: 16/405,369

(22) Filed: May 7, 2019

(65) Prior Publication Data

US 2019/0342000 A1 Nov. 7, 2019

Related U.S. Application Data

(60) Provisional application No. 62/667,940, filed on May 7, 2018.

(51) Int. Cl.
*H04B 7/212* (2006.01)
*H04B 7/185* (2006.01)

(52) U.S. Cl.
CPC ......... *H04B 7/212* (2013.01); *H04B 7/18517* (2013.01); *H04B 7/18545* (2013.01); *H04B 7/18589* (2013.01); *H04B 7/2125* (2013.01)

(58) Field of Classification Search
CPC ............... H04B 7/212; H04B 7/18517; H04B 7/18545; H04B 7/18589; H04B 7/2125
See application file for complete search history.

(56) References Cited

U.S. PATENT DOCUMENTS 6,324,473 B1 * 11/2001 Eschenbach ............ G01S 19/07
701/470
6,408,178 B1 * 6/2002 Wickstrom ............. G01S 19/24
342/352

(Continued)

FOREIGN PATENT DOCUMENTS

EP 1166143 1/2002

OTHER PUBLICATIONS

PCT/US2019/031112 International Search Report and Written Opinion dated Jul. 15, 2019 (19 pages).

*Primary Examiner* — Michael J Moore, Jr.
(74) *Attorney, Agent, or Firm* — Michael Best & Friedrich LLP

(57) ABSTRACT

Devices, methods, and systems for uplink synchronization in time division multiple access (TDMA) satellite network. In one embodiment, an earth-based satellite terminal is configured to communicate with a satellite hub through a satellite using the TDMA communication protocol. The earth-based satellite terminal is configured to determine its own location, a location of the satellite, estimate a distance between the location of the terminal and the location of the satellite, determine a Coarse Timing Advance based on the distance that is estimated, and transmit data to the satellite based on the Coarse Timing Advance and the TDMA communication protocol. The Coarse Timing Advance may allow uplink TDMA communication without a preamble transmission on a random access channel, the preamble transmission being required in many conventional systems.

23 Claims, 9 Drawing Sheets

(56) References Cited

U.S. PATENT DOCUMENTS

| | | | | |
|---|---|---|---|---|
| 6,834,039 B1* | 12/2004 | Kelly | H01Q 1/1257 | 370/229 |
| 7,215,652 B1* | 5/2007 | Foley | H04B 7/212 | 370/316 |
| 10,084,535 B1* | 9/2018 | Speidel | H04B 7/18532 | |
| 2001/0043573 A1* | 11/2001 | Kelly | H01Q 3/08 | 370/316 |
| 2004/0090935 A1* | 5/2004 | Courtney | H04W 36/0009 | 370/331 |
| 2005/0053099 A1* | 3/2005 | Spear | H04W 56/0055 | 370/508 |
| 2005/0174235 A1* | 8/2005 | Davis | G08B 21/0269 | 340/539.13 |
| 2006/0072520 A1* | 4/2006 | Chitrapu | H04B 7/2656 | 370/337 |
| 2007/0230643 A1* | 10/2007 | Beadle | H04W 56/0035 | 375/350 |
| 2007/0243822 A1* | 10/2007 | Monte | H04J 3/10 | 455/12.1 |
| 2008/0043663 A1* | 2/2008 | Youssefzadeh | H04B 7/18528 | 370/321 |
| 2010/0159922 A1 | 6/2010 | Tronc et al. | | |
| 2010/0309051 A1* | 12/2010 | Moshfeghi | H04W 64/006 | 342/378 |
| 2010/0323723 A1* | 12/2010 | Gerstenberger | G01S 5/0242 | 455/456.5 |
| 2011/0256865 A1* | 10/2011 | Sayeed | H04B 7/18589 | 455/427 |
| 2013/0315136 A1* | 11/2013 | Bhaskar | H04B 7/18513 | 370/316 |
| 2015/0158602 A1* | 6/2015 | Marshack | H04B 7/185 | 244/158.4 |
| 2019/0159149 A1* | 5/2019 | Ryu | H04W 56/0045 | |
| 2020/0313760 A1* | 10/2020 | Laws | H04B 7/18517 | |

\* cited by examiner

DEVICES, METHODS, AND SYSTEMS FOR UPLINK SYNCHRONIZATION IN TIME DIVISION MULTIPLE ACCESS (TDMA) SATELLITE NETWORK

CROSS-REFERENCE TO RELATED APPLICATION

This application claims the benefit of U.S. Provisional Application No. 62/667,940, filed on May 7, 2018, the entire content of which is herein incorporated by reference.

FIELD

The present disclosure relates generally to wireless communication systems. More specifically, the present disclosure relates to a wireless communication system with time division multiple access (referred to as "TDMA") on the uplink (also referred to as the "return link").

BACKGROUND

The physical layer of a satellite air interface may include Time Division Multiple Access (TDMA) on the Uplink (UL), also referred to as the Return Link (RL). TDMA may be present as one component of the multiple access scheme of air interface, which may include other components, such as Frequency Division Multiple Access (FDMA). OFDMA is an example of such mixed, multiple access schemes. The teachings of this invention are therefore applicable to modern air interfaces using OFDMA, such as LTE and 5G, as they are to classic air interfaces such as GSM which used exclusively TDMA.

In TDMA, different users' signals are kept separated, that is mutually non-interfering or orthogonal, based on distinct, non-overlapping arrival times at the satellite. In a satellite network, compared to a terrestrial wireless network, user terminals may be distributed over a much larger geographical area, involving much greater differential propagation delays among the earth-based satellite terminals than in a terrestrial wireless network. This increases the challenge of maintaining uplink orthogonality in satellite networks relative to terrestrial networks. In TDMA systems, the uplink orthogonality is maintained by time staggering the uplink transmissions from different terminals, by a technique known as "timing advance" (also referred to herein as "TA").

SUMMARY

Conventional schemes have problems when the values of the required timing advance exceed a frame duration of the air interface in use. In the present context, a "frame" is a period within the TDM/TDMA system time structure which, if exceeded by the required timing advance, creates protocol specification issues that may lead to overlap between transmissions from different terminal transmissions. The systems and methods of the present disclosure solve the problems of the conventional schemes.

For example, in one embodiment, the present disclosure includes earth-based satellite terminal including a satellite transceiver, a memory, and an electronic processor communicatively connected to the memory and the satellite transceiver. The satellite transceiver is configured to communicate with a satellite using a time division multiple access (TDMA) communication protocol. The electronic processor is configured to determine a location of the earth-based satellite terminal, determine a location of the satellite, estimate a distance between the location of the earth-based satellite terminal and the location of the satellite, determine a Coarse Timing Advance based on the distance that is estimated, and control the satellite transceiver to transmit data to the satellite based on the Coarse Timing Advance and the TDMA communication protocol.

For example, in a second embodiment, the present disclosure includes a wireless communication method. The method includes determining, with an electronic processor of an earth-based satellite terminal, a location of the earth-based satellite terminal. The method includes determining, with the electronic processor, a location of a satellite. The method includes estimating, with the electronic processor, a distance between the location of the earth-based satellite terminal and the location of the satellite. The method includes determining, with the electronic processor, a Coarse Timing Advance based on the distance that is estimated. The method also includes controlling, with the electronic processor, a satellite transceiver of the earth-based satellite terminal to transmit data to the satellite based on the Coarse Timing Advance and a time division multiple access (TDMA) communication protocol.

In a third embodiment, the present disclosure includes a time division multiple access (TDMA) communication system including a satellite and an earth-based satellite terminal. The earth-based satellite terminal including a satellite transceiver, a memory, and an electronic processor. The satellite transceiver is configured to communicate with the satellite using the TDMA communication protocol. The electronic processor is configured to determine a location of the earth-based satellite terminal, determine a location of the satellite, estimate a distance between the location of the earth-based satellite terminal and the location of the satellite, determine a Coarse Timing Advance based on the distance that is estimated, and control the satellite transceiver to transmit data to the satellite based on the Coarse Timing Advance and the TDMA communication protocol.

DETAILED DESCRIPTION OF EXEMPLARY EMBODIMENTS

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
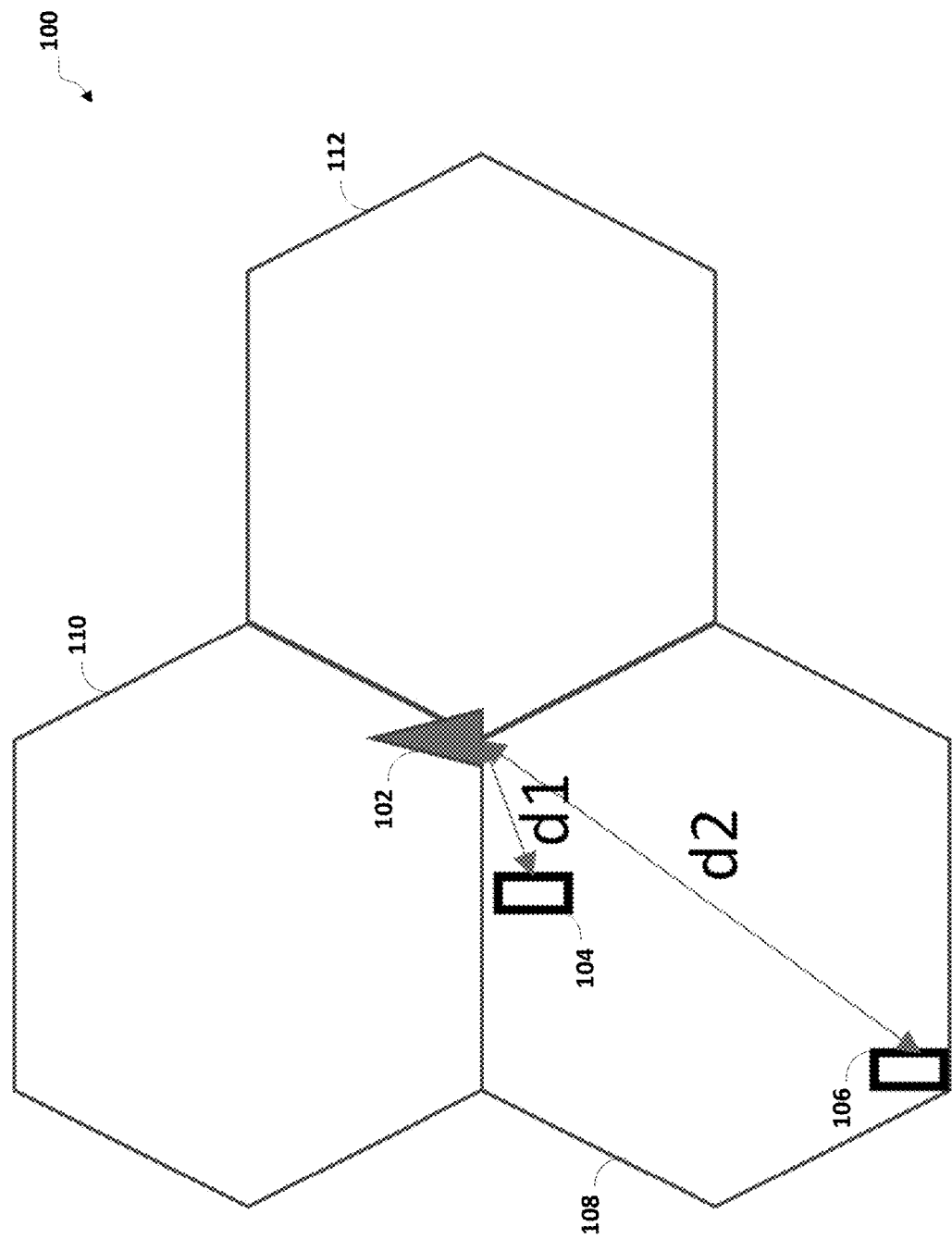
FIG. 1 is a diagram that illustrates a terrestrial wireless communication system.

FIG. 1 is a diagram that illustrates a terrestrial wireless communication system 100. In the example of FIG. 1, the terrestrial wireless communication system 100 includes a base station tower 102, a first terrestrial terminal 104, a second terrestrial terminal 106, and three cells 108-112. As illustrated in FIG. 1, the first terrestrial terminal 104 is located a first distance ("d1") from the base station tower 102 and the second terrestrial terminal 106 is located a second distance ("d2") from the base station tower 102. The first terrestrial terminal 104 and the second terrestrial terminal 106 are located in the cell 108.

The "propagation delay" is the roundtrip delay from the base station tower 102 to one of the two different terrestrial satellite terminals 104 and 106. The differential, roundtrip propagation delay between the two different earth-based satellite terminals 104 and 106 is defined by Equation 1.

$$\text{Differential, roundtrip propagation delay}=2*(d1-d2) \quad (1)$$

Figure 2:
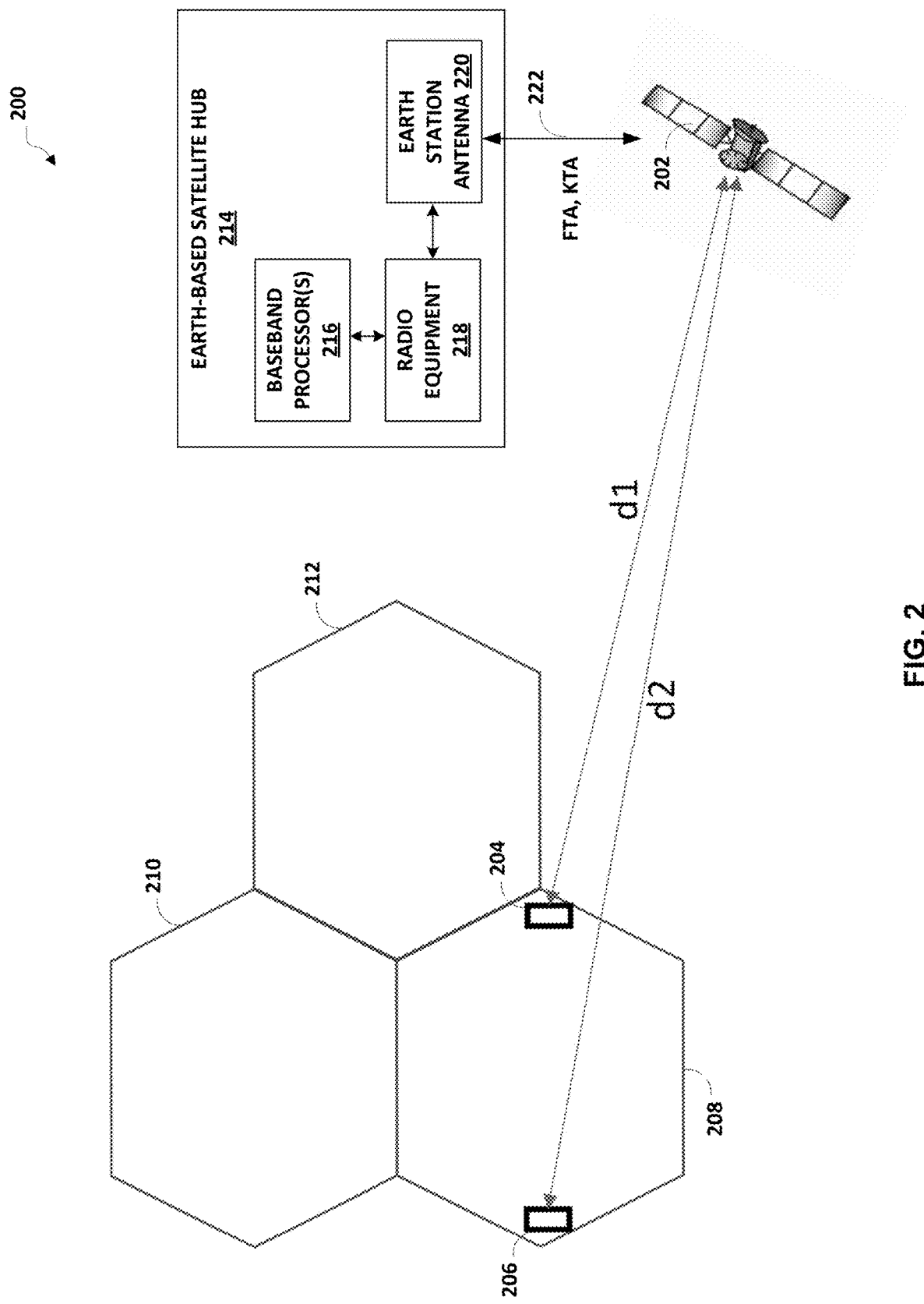
FIG. 2 is a diagram that illustrates a satellite wireless communication system.

FIG. 2 is a diagram of a satellite wireless communication system 200. In the example of FIG. 2, the satellite wireless communication system 200 includes a satellite 202, a first earth-based satellite terminal 204, a second earth-based satellite terminal 206, and three spotbeams 208-212, and a satellite hub 214. As illustrated in FIG. 2, the first earth-based satellite terminal 204 is located a first distance ("d1") from the satellite 202 and the second earth-based satellite terminal 206 is located a second distance ("d2") from the satellite 202. The first earth-based satellite terminal 204 and the second earth-based satellite terminal 206 are located in the spotbeam 208.

In the example of FIG. 2, the satellite 202 is a bent-pipe, or non-demodulating satellite. In the satellite wireless communication system 200, end-to-end communication occurs between the earth-based satellite terminals 204 and 206 and the satellite hub 214 (also referred to as a "satellite gateway").

The satellite hub 214 includes one or more baseband processors 216, radio equipment 218, and an earth station antenna 220. The baseband processors 216 assess the uplink timing advance. The earth station antenna 220 communicates with the satellite 202 via a feeder link 222.

In some examples, where the satellite 202 is a demodulating satellite, the satellite 202 may be perform the assessment of the uplink timing advance on board. The teachings of the present disclosure are equally applicable to both cases because the additional propagation delay of the feeder link 222, in the case of bent-pipe satellites, makes no contribution to the differential delay between terminals. Equalizing this differential delay is the main objective of uplink synchronization in a TDMA system.

The "propagation delay" is the roundtrip delay from the satellite 202 to each of the two different earth-based satellite terminals 204 and 206. The differential, roundtrip propagation delay between the two different earth-based satellite terminals 204 and 206 is also defined by Equation 1. The differential, roundtrip propagation delay in the satellite wireless communication system 200 is likely to be larger than the differential, roundtrip propagation delay in the terrestrial wireless communication system 100 because the first distance d1 and the second distance d2 of FIG. 2 are larger than the first distance d1 and the second distance d2 of FIG. 1, respectively.

The greater differential propagation delay in a satellite network (that is, the propagation delay difference between the nearest and farthest user terminal location in a given spotbeam, relative to the satellite) makes it more difficult to maintain the time orthogonality on the uplink than the terrestrial network, for TDMA based communication protocols. Therefore, there is the possibility of uplink bursts colliding at the satellite unless the transmit times of the bursts are appropriately staggered in time to avoid collision.

In order to appreciate the improvements afforded by the present invention and introduce relevant terms of reference, it is worthwhile reviewing the technical approach used in GMR-2, a satellite air interface based on GSM, which also uses TDMA. The technical approach of GMR-2 is described below in greater detail.

GMR-2 is an ETSI and TIA standard and is representative of a conventional TDMA communication system. GMR-2 uses a timing advance parameter that comprises a fixed part and two variable parts. The fixed part (referred to as a Coarse Timing Advance or "CTA") is linked to a given spotbeam. The variable parts (referred to as Fine Timing Advance or "FTA" and a Delta Timing Advance or "DTA") are linked, respectively, to (a) a location of a given earth-based satellite terminal within the spotbeam and (b) the movements of the given earth-based satellite terminal and the satellite 202. The FTA and DTA variable parts are communicated to the given earth-based satellite terminal by the satellite hub 214 through the satellite 202 via one or more downlink messages.

The timing advance estimations by the satellite hub 214 are based on observed arrival times of uplink random access channel (RACH) preamble bursts at the satellite, relative to their ideal arrival time according to the "system TDM." The "system TDM" defines the system time base for the network and is referenced to the location of the satellite. The ideal arrival time is at the center of the RACH window 408 in the system TDM frame structure, illustrated as frame 402A in FIG. 4. Unlike the DTA and FTA, the CTA does not have to be communicated to the given earth-based satellite terminal because the given earth-based satellite terminal determines the CTA upon identifying the spotbeam to which the given earth-based satellite terminal has established access, also referred to as "camping on." The identification of the spotbeam may be from information that is directly loaded onto the given earth-based satellite terminal via a configuration process or distributed to the given earth-based satellite terminal via a downlink (DL) control channel, such as a broadcast control channel (BCCH).

To initiate a new inbound call in GMR-2, a given earth-based satellite terminal synchronizes to the downlink TDM, determines the spotbeam ID, and the CTA based on the spotbeam ID, and then sends an uplink RACH preamble burst with the said CTA. This RACH preamble burst arrives at the satellite 202 with an error, τ, relative to the center of the RACH window in the system TDM. The satellite hub 214 determines the value of ti and communicates this to the given earth-based satellite terminal as FTA. The given earth-based satellite terminal adds FTA to CTA and makes that the timing advance for all subsequent uplink transmissions. Periodically, as the given earth-based satellite terminal changes location and the satellite 202 moves, further adjustment to the timing advance may be necessary, and are made with the DTA. It is noteworthy that FTA and DTA are required because, while CTA may be sufficient to ensure that the error in RACH burst may be sufficiently small to ensure that it lands inside the RACH window (with its allowed guard time), this error with respect to the RACH burst would be too large for the uplink TDMA traffic and control channels. To decrease the error, the uplink synchronization process includes the steps of: (1) the hub 214 making an assessment of the time-of-arrival error in the RACH burst and communicating this error to the earth-based satellite terminals through the FTA, (2) the hub 214 continuously assessing the errors in the arrival times of the uplink TDMA bursts, and (3) providing feedback to the earth-based satellite terminals of the said timing errors through the DTA, if the said additional correction is required.

Like GMR-2, in some examples, a system of the present disclosure also uses a hierarchy of CTA, FTA, and DTA. However, unlike conventional TDMA communication systems (e.g., GMR-2), the CTA of the present disclosure is based on a direct estimation of the distance from the earth-based satellite terminal to the satellite. This direct estimation may be made with sufficient accuracy that the size of the of the RACH window may be reduced to a range (few milliseconds) that is similar to that used in modern cellular wireless systems. This direct estimation also facilitates alignment between cellular and satellite ecosystems, which is extremely advantageous for the satellite ecosystems. Furthermore, the linkage between spotbeam size and RACH window size, present in conventional TDMA communication systems, is severed in the present system. Thus, large, global beams, which have advantages in certain applications, may be deployed with small RACH windows, i.e., a few millisecond as discussed above. The available of large, global beams with small RACH windows enables beam design flexibility that does not exist in the conventional TDMA systems.

In some embodiments, depending on the accuracy with which the distance from the earth-based satellite terminal to the satellite is estimated, the CTA of the present disclosure may, by itself, provides sufficient accuracy for uplink synchronization of all TDMA channels. A CTA that provides sufficient accuracy for uplink synchronization of all TDMA channels would reduce the transaction latency and increase uplink capacity by reducing or eliminating the need for a RACH preamble.

Figure 3:
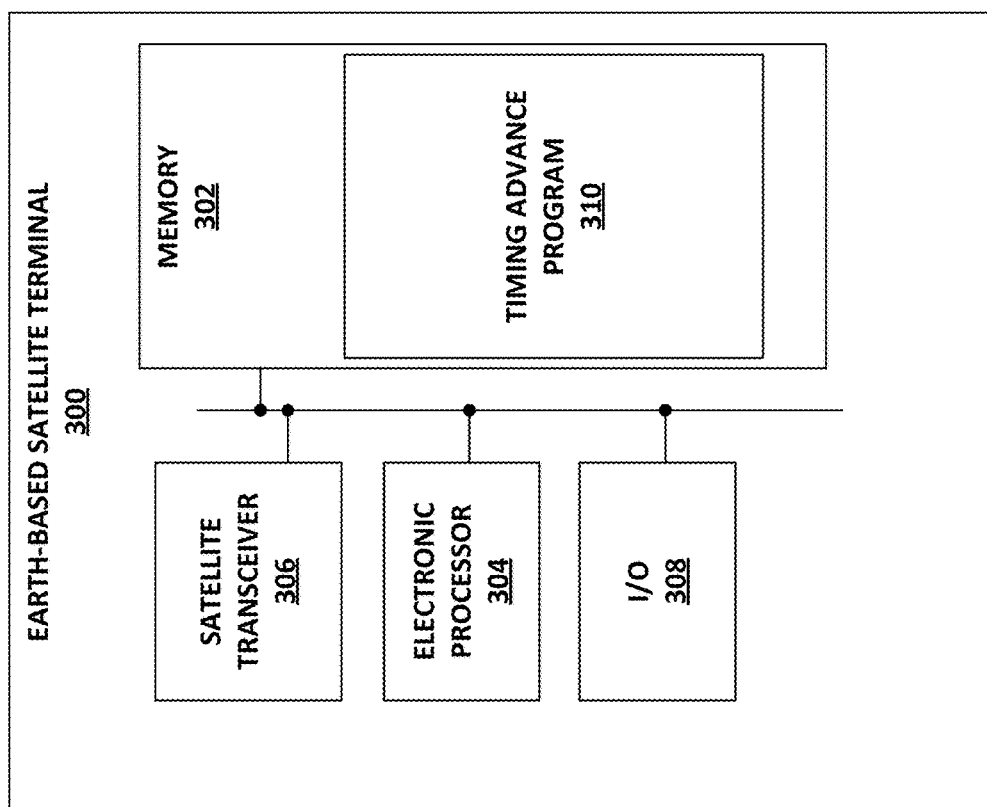
FIG. 3 is a block diagram that illustrates an earth-based satellite terminal, according to various exemplary embodiments of the present disclosure.

FIG. 3 is a block diagram illustrating an earth-based satellite terminal 300 in accordance with various embodiments of the present disclosure. In the example of FIG. 3, the earth-based satellite terminal 300 includes a memory 302, an electronic processor 304 (for example, a microprocessor or another suitable processing device), a satellite transceiver 306, and an input/output (I/O) interface 308.

It should be understood that, in some embodiments, the earth-based satellite terminal 300 may include fewer or additional components in configurations different from that illustrated in FIG. 3. Also, the earth-based satellite terminal 300 may perform additional functionality than the functionality described herein. As illustrated in FIG. 3, the memory 302, the electronic processor 304, the satellite transceiver, and the I/O interface 308 are electrically coupled by one or more control or data buses enabling communication between the components.

The memory 302 (also referred to as a "non-transitory computer-readable medium") may include a program storage area (for example, read only memory (ROM)) and a data storage area (for example, random access memory (RAM), and other non-transitory, machine-readable medium). In some examples, the program storage area stores the instructions regarding the Timing Advance program 310.

The electronic processor 304 executes machine-readable instructions stored in the memory 302. For example, the electronic processor 304 executes instructions stored in the memory 302 to perform the timing advance functionality described below regarding uplink synchronization at the satellite 202. In some examples, the electronic processor 304 a microprocessor, an application-specific integrated circuit ("ASIC"), or other suitable electronic processor. In one example, the Timing Advance program 310 causes the electronic processor 304 to directly estimate the distance from the earth-based satellite terminal 300 to the satellite 202, determine a CTA from the direct estimation, and control the RACH transmission based on the CTA. The specific methods performed by the electronic processor 304 by executing the Timing Advance program 310 is explained in greater detail below with respect to FIGS. 9-10.

In some examples, the I/O interface 308 may include an Ethernet I/O interface. In other examples, the I/O interface 308 may include a wireless interface (for example, WiFi, LTE, LTE Advanced, 5G, or other suitable wireless interface). In yet other examples, the I/O interface 308 may include a navigation transceiver (for example, a GPS transceiver and/or a GNSS transceiver). In some examples, the I/O interface 308 may include a combination of an Ethernet I/O interface, a wireless interface, and/or the navigation transceiver.

Figure 4:
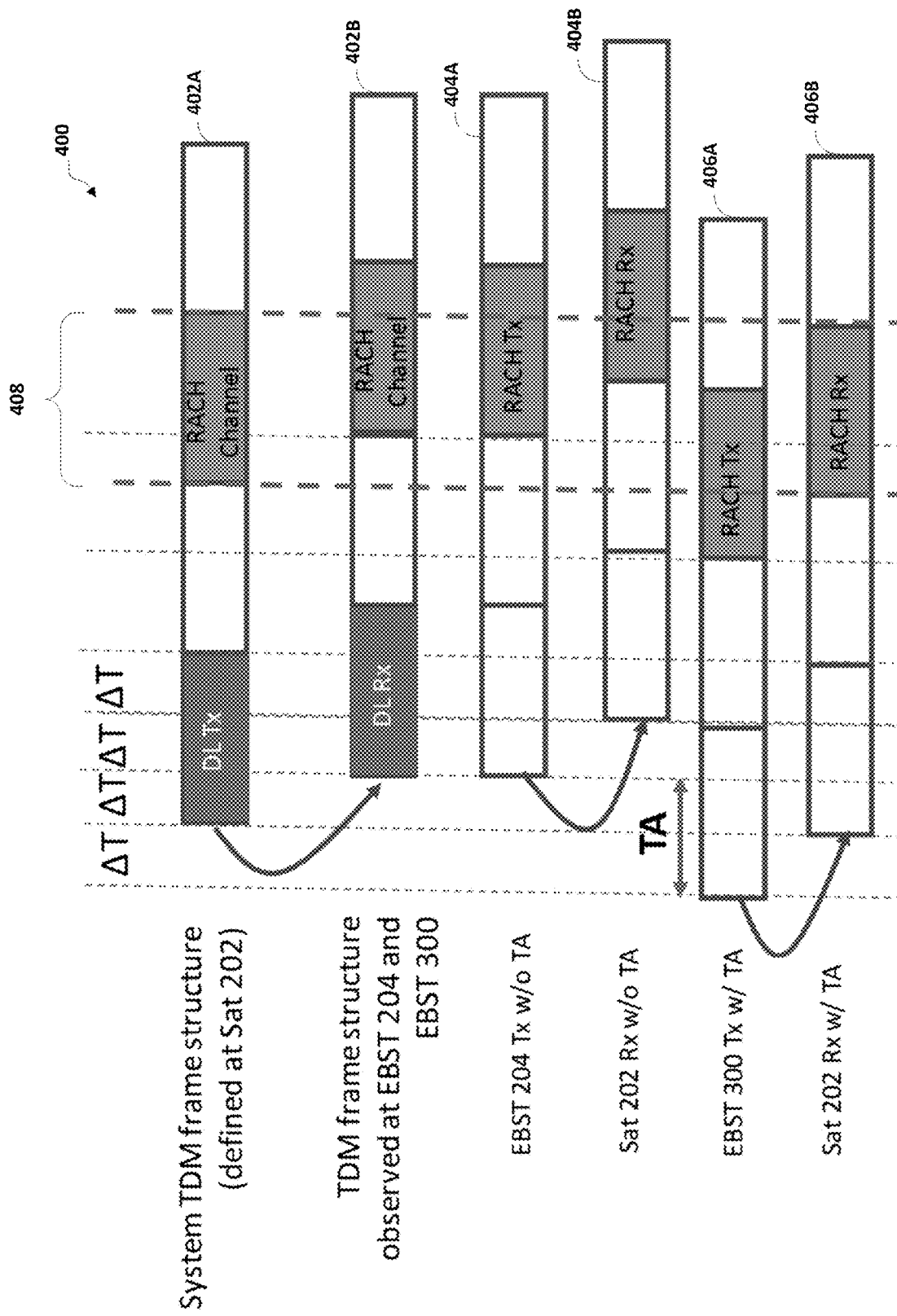
FIG. 4 is a timing diagram that illustrates a timing advance by the earth-based satellite terminal of FIG. 3 that overcomes the differential propagation delay in the satellite wireless communication system of FIG. 2.

FIG. 4 is a timing diagram that illustrates a timing advance by the earth-based satellite terminal 300 of FIG. 3 that overcomes the differential propagation delay in the satellite wireless communication system of FIG. 2. In the example of FIG. 4, the timing diagram 400 includes three timing pairs 402-406 for transmission and reception of data sequences by either the satellite 202 and the earth-based satellite terminal 204 or the satellite 202 and the earth-based satellite terminal 300.

As explained above, for ease of understanding, the satellite 202 is a bent-pipe, or non-demodulating satellite. Therefore, the ultimate source and destination of signals said to be "transmitted" and "received" by the satellite 202 is the satellite hub 214, which is communicatively coupled to the satellite 202 by the feeder link 222. The estimation of propagation delays is performed at the satellite hub 214. As the propagation delay of the feeder link 222 is common between different terminals, and do not contribute to the differential delays, the propagation delay of the feeder link 222 is not addressed in this disclosure. Additionally, as explained above, the concepts and methods taught herein are equally applicable to both non-demodulating satellites as well as demodulating satellites.

As illustrated in FIG. 4, the first timing pair 402 illustrates a Time Division Multiplex (TDM) frame structure 402A for the satellite network. The TDM frame structure 402A is considered the network-wide, reference system time, or "system TDM frame." The frame structure includes time slots reserved for both downlink and uplink data sequences, or TDM channels. One of the uplink TDM channels is reserved for the reception of a Random Access Channel (RACH), transmitted by the earth-based satellite (EBST) terminals 204, 206 of FIG. 2 or the earth-based satellite terminal (EBST) 300 of FIG. 3. A downlink burst transmitted according to the system TDM frame 402A is received by the earth-based satellite terminal 204 or the earth-based satellite terminal 300 with a one hop delay, ΔT, and is shown by the timing 402B. With respect to the earth-based satellite terminal 204, the received system TDM frame 402B represents the local system time for the earth-based satellite terminal 204, and is linked to its location.

The second timing pair 404 in FIG. 4 illustrates an example where no timing advance is used by the earth-based satellite terminal 204. According to this approach, the uplink RACH burst (for messages such as access requests) is transmitted at its designated time slot in the TDM frame 404A, which is aligned with the received system TDM frame 402B. The RACH burst in the TDM frame 404A burst is received at the satellite as the TDM frame 404B with a one hop delay of ΔT. As the TDM frame 404A itself includes a one hop delay of ΔT referenced to the system TDM frame 402A, there is a net timing error, or offset, of 2·ΔT in the RACH burst received at the satellite 202, relative to its expected position at the center of the RACH window 408 in the system TDM frame 402A.

As illustrated in FIG. 4, the third timing pair 406 mitigates the time misalignment in the second timing pair 404 by advancing the transmit time of the earth-based satellite terminal 300 relative to its local system time 402B by 2·ΔT. The data sequence associated with the timing 406A is an example of such a time advanced transmission. This data sequence is received at the satellite 202 as the data sequence associated with the timing 406B, which is exactly time aligned with the reference system time, represented by the timing 402A. Stated differently, the RACH burst by the earth-based satellite terminal 300 is received at the satellite 202 in the RACH window 408.

As mentioned above, the conventional methods face problems with differential propagation delay when a satellite spotbeam grows larger and/or the frame size becomes smaller. The conventional solution is to use larger frames, which can accommodate larger RACH windows, to mitigate the above problems. The term "larger" means that the size of the RACH window is increased enough to accommodate the large delay spread (with guard time inside the frame) when a satellite spotbeam is increased in size. As described in greater detail below for the satellite spotbeam examples provided in FIGS. 5-7, the size of the RACH window would need to be sufficient to accommodate a propagation delay range of at least 1.3 milliseconds (ms) for 183 spotbeams and 34 ms for a global spot beam.

However, the use of large RACH windows, and consequently, larger frames, has certain disadvantages. Satellite ecosystems may benefit by reusing components developed for terrestrial wireless ecosystems owing to the greater scale of the terrestrial wireless ecosystems, which can support greater R&D expenditures. However, to adapt modern terrestrial wireless air interfaces, for example, LTE Advanced and 5G, for use in mobile satellite applications, the frame size needs to be similar to those used in terrestrial wireless air interfaces, i.e., approximately 1 ms. Therefore, it is desirable to adopt such small frames even in satellite systems, although, the long round trip delays, especially for conventional GEO satellites, demand larger frames, of the order of tens of milliseconds.

Uplink time staggering (referred to as Timing Advance or "TA") is also performed in existing terrestrial wireless networks but the required timing advance is small compared to the uplink frame duration. When the required timing advance exceeds the uplink frame duration, TDMA communication protocol design problems may result.

Figure 5:
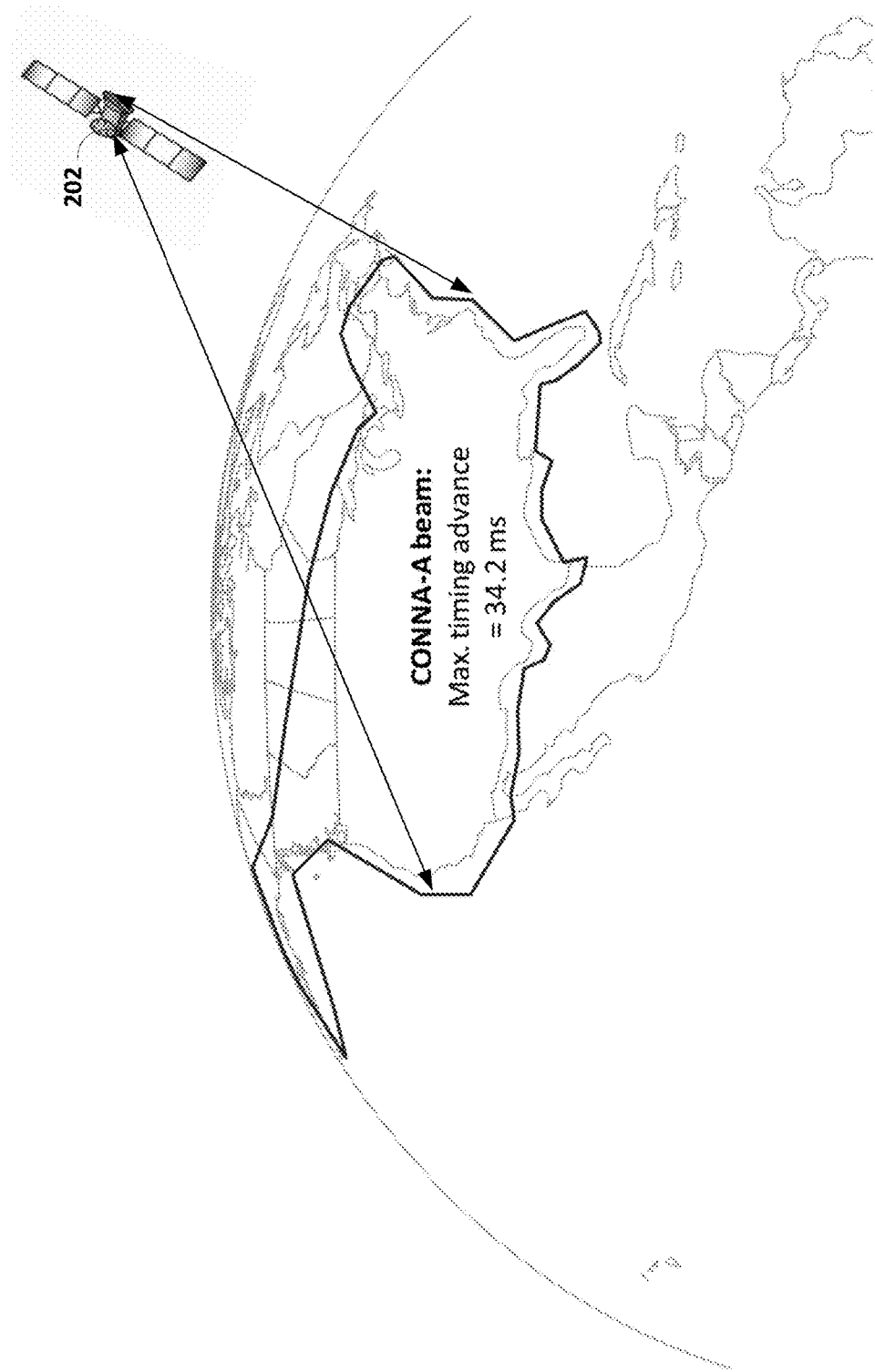
FIGS. 5-7 are diagrams that illustrate examples of differential (round trip) propagation delays involving a satellite with a global beam, 183 beams, and 21 beams, respectively.
Figure 6:
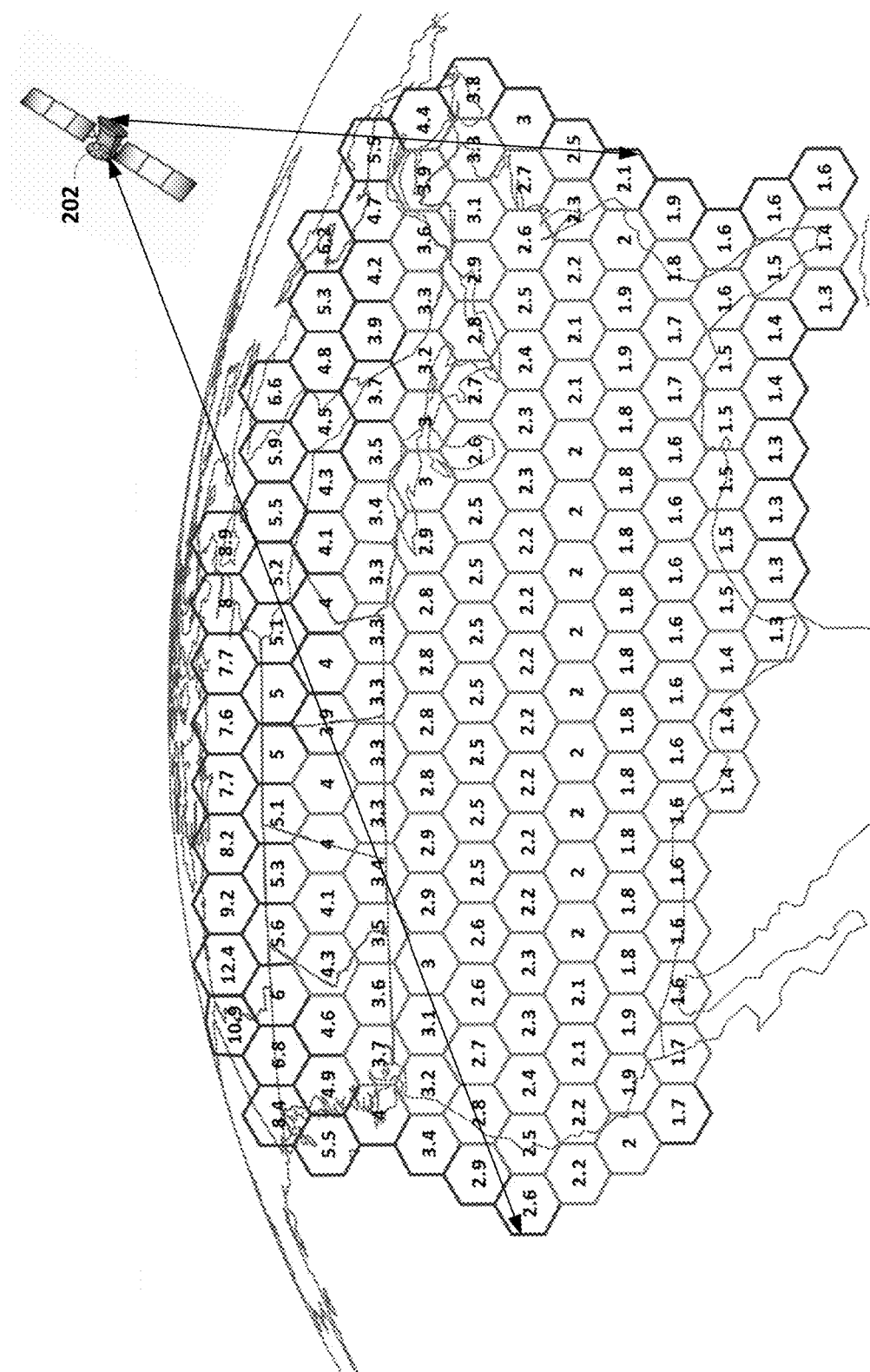
Figure 7:
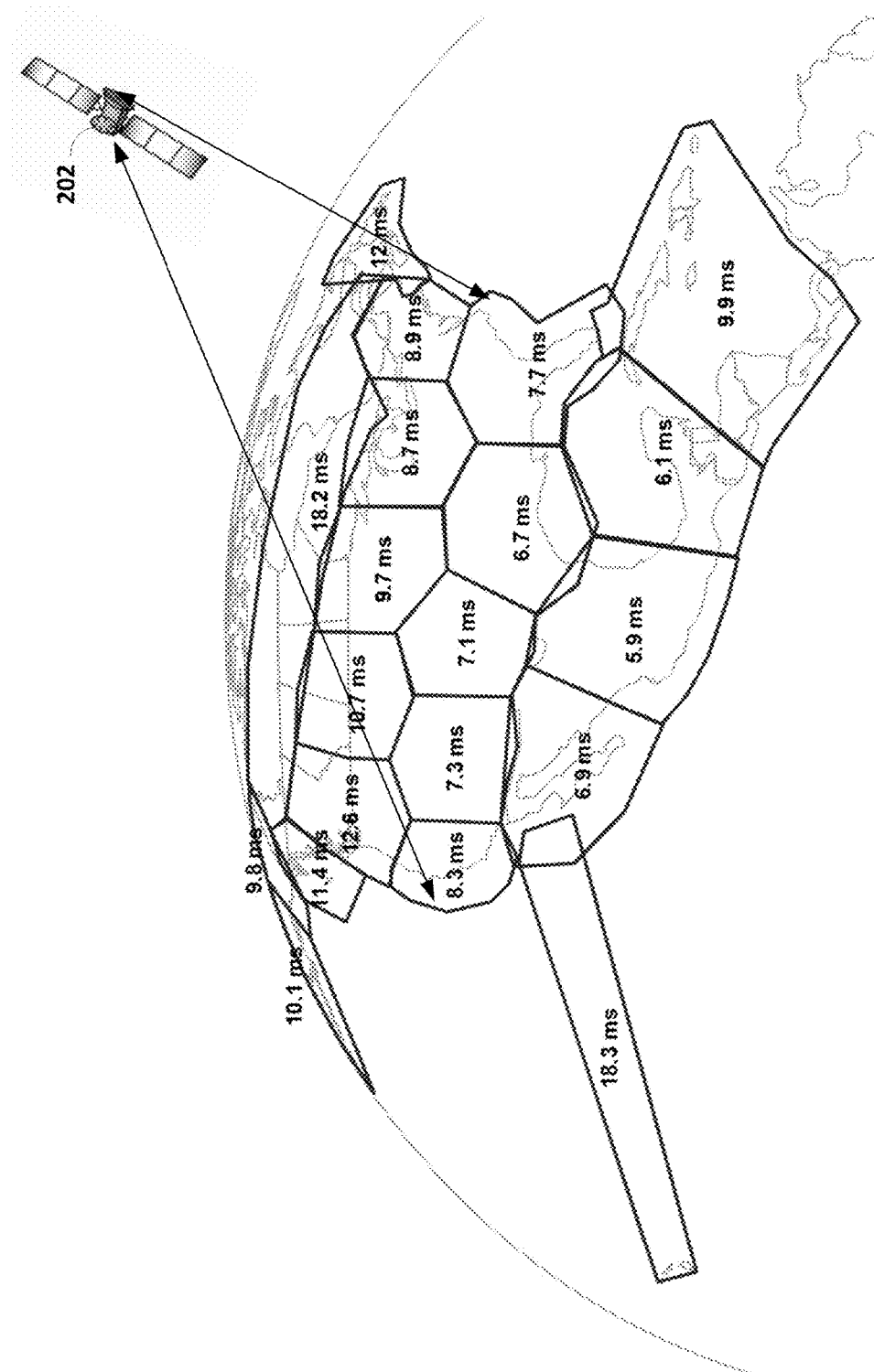

The desired beam sizes of satellite networks range from having round trip delays of a few milliseconds to tens of milliseconds. FIGS. 5-7 illustrate examples of differential (round trip) propagation delays involving Ligado Network's SkyTerra-1 satellite (for example, the satellite 202 of FIG. 2) for various, example beam sizes. As illustrated in FIG. 5, the satellite 202 has a differential propagation delay of 34 ms to cover an area involving the US and Southern Canada with a single "global beam." As illustrated in FIG. 6, the satellite 202 has a differential propagation delay that varies from 1.3 ms to 12.4 ms when a deployment of 183 beams covers the same area (wherein a beam is approximately 150 km in diameter). As illustrated in FIG. 7, the satellite 202 has a differential propagation delay that varies from 5.9 ms to 12.6 ms (ignoring the Hawaii beam) with an intermediate beam size corresponding to 21 beams and covering the US and Canada.

The frame size in 3GPP wireless terrestrial air interfaces is approximately 1 ms (LTE-M, NB IOT). None of the above beam designs would meet the requirement of limiting timing advance to less than the frame size of 1 ms.

As explained above, the earth-based satellite terminal 300 overcomes the challenge of the small frame size in 3GPP wireless terrestrial air interfaces by determining a Coarse Timing Advance (CTA) based on an estimated distance between the earth-based satellite terminal 300 and the satellite 202. The earth-based satellite terminal 300 may determine its own location autonomously using a navigation service (for example, GPS or GNSS), a terrestrial wireless navigation system, an inertial navigation system, or some combination thereof. Additionally, the earth-based satellite terminal 300 may acquire information indicative of the location of the satellite through one of a variety of means. For example, the earth-based satellite terminal 300 may acquire the ephemeris data of the satellite 202, i.e., the absolute location of the satellite 202 in space, via a broadcast over a downlink control channel (for example, a broadcast control channel or "BCCH"), wherein the ephemeris information is gathered by ancillary equipment at the satellite hub 214, which periodically estimates the location of the satellite in space through ranging methods known in the prior art.

Before sending messages on the uplink to the satellite, the earth-based satellite terminal 300 synchronizes to the time/frequency references as observed at the location of the earth-based satellite terminal 300. After the time/frequency synchronization, the earth-based satellite terminal 300 transmits a connection request message on an uplink TDMA RACH channel, with a timing advance that is designed to be synchronized to the uplink random access time window, or slot, in the system TDM, which is referenced to the location of the satellite 202, as shown in FIG. 4 and explained above. The timing advance is defined by Equation 2.

$$\text{Timing Advance} = 2*\Delta T = 2*(D/c) \qquad (2)$$

In Equation 2, ΔT is the one-way propagation time from the satellite to the earth-based satellite terminal, D is the distance from the satellite 202 to the earth-based satellite terminal 300, and c is the velocity of light. In Equation 2, it is assumed that propagation is essentially over free space, although passage through the atmosphere (ionosphere and troposphere) will cause some additional delay, which may be upper bounded to 10 meters (m), or 10/3E8 s=33 nanoseconds (ns). Therefore, the propagation delay may safely be assumed to correspond to free space propagation.

Additionally, errors in the location of the earth-based satellite terminal 300 and/or the location of the satellite 202 contribute to an error in the timing advance. However, modern GPS/GNSS modules in the earth-based satellite terminal 300 have an accuracy that is better than 10 m which, as described above, leads to an error of only 33 (ns), which is negligible compared to the frame length of 1 ms. The location of the satellite 202 is measured continuously by the satellite network infrastructure and is known with an accuracy that is sufficient to limit the error contribution to a negligible value, relative to RACH receive window of 1 ms.

The satellite ephemeris data may be broadcast to the earth-based satellite terminal 300 on a downlink control channel using several different approaches, which consume different amount of valuable satellite network capacity. In a first approach, the absolute location, e.g. the location specified by latitude, longitude and distance from the center of the Earth may be broadcast periodically on the broadcast control channel. However, this broadcast would require a large amount of information and more frequent broadcast than the other approaches described below, consuming relatively more downlink capacity.

In a second approach, the earth-based satellite terminal 300 has predefined information about the approximate location of the satellite in space. By moving the origin of the coordinate system from the center of the Earth to a fixed, or quasi-fixed, point in space in the vicinity of the satellite, the amount of information that needs to be transmitted from the hub to the terminal is substantially reduced. This is because the amount of the said information is proportional to the length of the position vector from the new coordinate system origin to the actual location of the satellite. One candidate for the new origin may be the mean position of the satellite over a long period, such as a year or several months, after which the location of the origin may be updated via the BCCH.

In a third approach, further reduction in the forward link capacity required to update ephemeris information may take the following form. A satellite's dynamics in space typically has a relatively well-known and predictable pattern. This pattern is often referred to as a 'figure of eight', although the figure is in three dimensions. If we assume that we know the approximate location of the satellite as function of time, this information may be stored in the memory of the terminal as the new coordinate origin, albeit as a function of time. Thereby, the size of the position vector of the true location of the satellite relative to this new, dynamic but known origin will be further reduced relative to the second approach, where the origin was fixed in space. The position vector representing the actual location of the satellite relative to the origin, be it fixed or dynamic, is referred to as an error vector as it represents the error of the assumed location of the satellite (the coordinate origin, or the modeled location) relative to the actual location.

Figure 8:
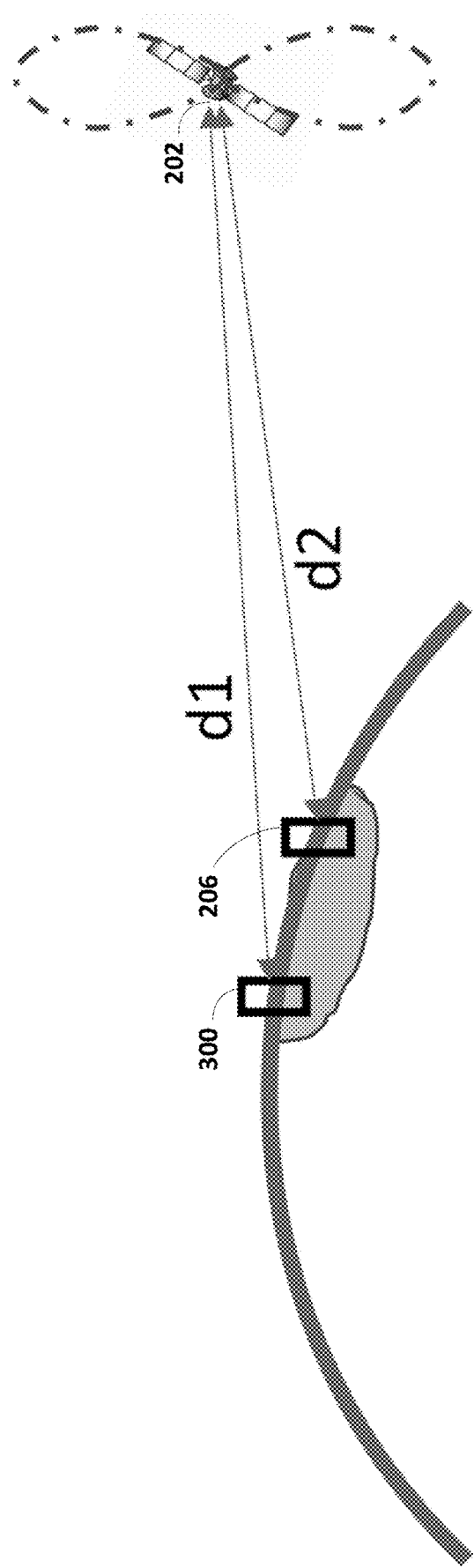
FIG. 8 is a diagram that illustrates a figure-of-eight pattern of the satellite of FIG. 2.

The repetitive, figure-of-eight pattern traced out by the satellite 202 in space, assuming the satellite is of the geosynchronous orbit type, is illustrated in FIG. 8. This may be viewed as a mathematical model of the mean position of the satellite 202 in space, derived from theoretical considerations and informed by empirical observations. At a selected frequency, for example, once every few seconds (s), the satellite hub 214 broadcasts the error (a three-dimensional position-error vector) between the present observed and the modeled position of the satellite, as illustrated in FIG. 8. The earth-based satellite terminal 300 determines the location of the satellite 202 using the broadcast error vector.

In a fourth approach, the satellite hub 214 does not broadcast information about the satellite's position. Instead, the figure-of-eight, or any other, theoretical model of the satellite's mean position (as a function of time) is treated as the true position of the satellite 202 and is used to determine the timing advance. This approach eliminates consumption of downlink satellite capacity due to continuous ephemeris distribution—the satellite location is determined unilaterally by the terminal with no assistance from the hub. However, this does not rule out the possibility of infrequent updates of the modeled satellite location—whether the model is updated at all or never becomes a capacity optimization question. The potential for uplink timing error will be greater in this case than in the other approaches but may be acceptable when the satellite dynamics are low, e.g. when satellite station keeping is employed, or relatively long RACH windows are acceptable.

The model of the satellite's position may be characterized by a limited set of key parameters (for examples, maximum azimuth and elevation excursions), involving less information content than a point-by-point map of the figure-of-eight pattern. The key parameters may be broadcast to all terminals. This model update is necessary because the maximum excursions of the figure-of-eight pattern changes over the life of the satellite.

The above approaches are not limited to geostationary satellites as described above. Indeed, they are also applicable to other satellite types (MEO/LEO) where the dynamics of the satellite orbits are sufficiently well known.

In some cases, where GPS/GNSS modules in the earth-based satellite terminal 300 may experience cold start or lack of GPS satellite acquisition, the earth-based satellite terminal 300 may use its last position information in the memory to estimate a Coarse Timing Advance, which can be subsequently improved by Fine Timing Advance and Delta Timing Advance.

Although there are similarities with conventional systems in the use of FTA and DTA to optimize and track uplink timing accuracy, the prime advantage of the present disclosure is a superior CTA. A CTA based on the satellite ephemeris makes the system of the present disclosure independent of satellite spotbeam size and conducive to small TDM frame sizes without any significant changes in the baseline terrestrial air interface protocols.

In some embodiments, given favorable satellite dynamics, the methods described herein for determining CTA may be sufficiently accurate that FTA and DTA may be redundant. In other words, the timing accuracy afforded by the CTA of the present disclosure may be sufficient for direct uplink transmission for traffic and control channels without feedback from a satellite hub (e.g., the satellite hub 214).

While the present disclosure describes sending a three dimensional error vector from the satellite hub 214 to the earth-based satellite terminal 300 through satellite 202, the methods herein are not dependent on satellite transport of the three dimensional error vector. For example, where coverage is available, the three dimensional error vector may be sent by terrestrial means, such as cellular public land-mobile networks (PLMN) or wireless local area networks (WLAN), such as Wi-Fi coupled to the internet. Terrestrial transport of the three dimensional error vector may conserve precious satellite capacity. Where, terrestrial coverage is insufficiently ubiquitous, multimode (satellite-terrestrial) transport may be used. Exclusively terrestrial coverage may be used when the earth-based satellite terminal 300 is mobile and the terrestrial coverage blockages are short relative to the time rate of change of the three dimensional error vector.

Figure 9:
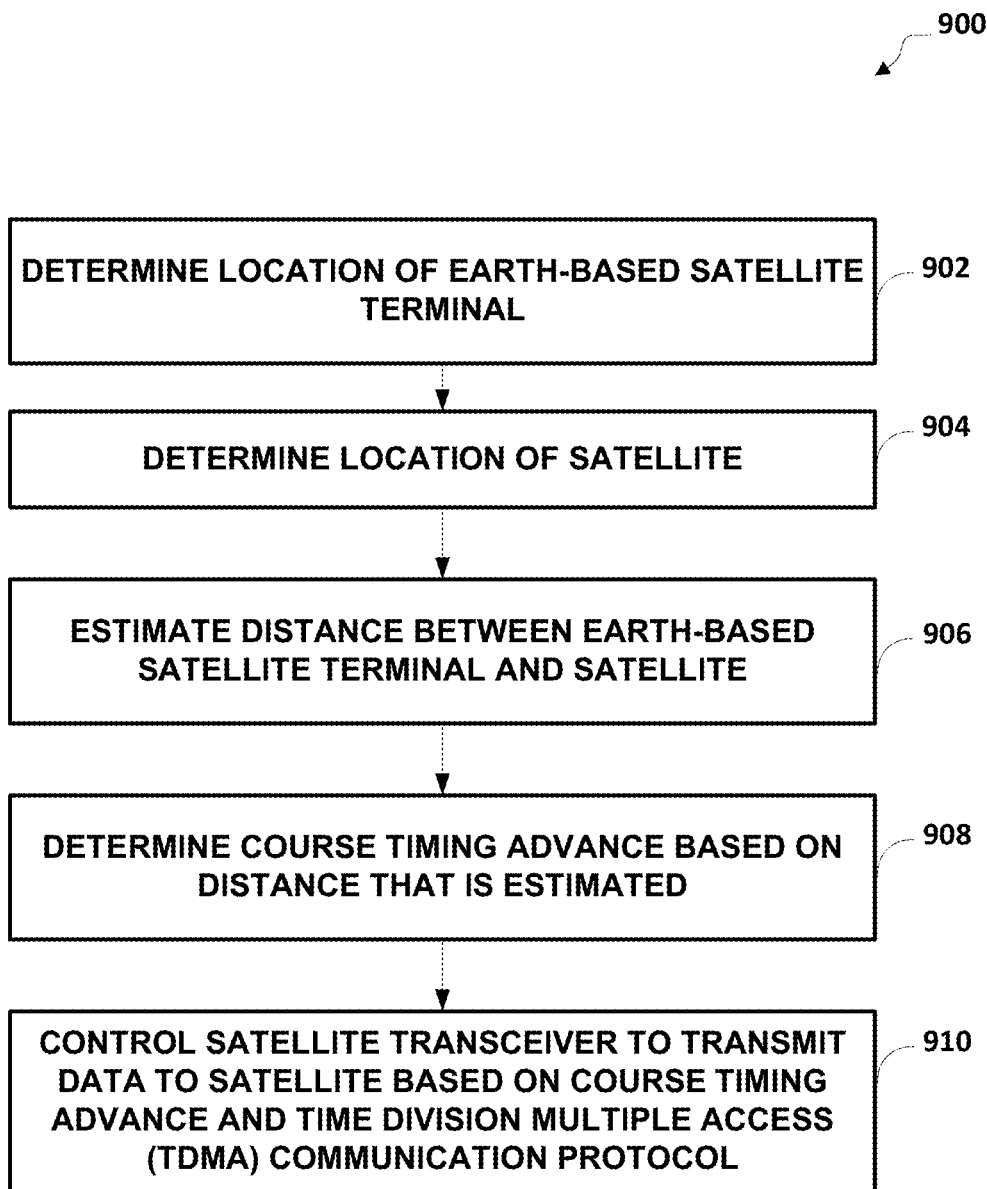
FIG. 9 is a flowchart of a wireless communication method, according to various exemplary embodiments of the present disclosure.

FIG. 9 is a flowchart of a wireless communication method 900. FIG. 9 is described with reference to the earth-based satellite terminal 300 of FIG. 3.

The method 900 includes determining, with an electronic processor 304, a location of the earth-based satellite terminal 300 (at block 902). For example, determining the location of the earth-based satellite terminal further includes receiving navigation information from a navigation transceiver, a terrestrial wireless navigation system, an inertial navigation system, or a combination thereof via an input/output interface of the earth-based satellite terminal, and determining the location of the earth-based satellite terminal based on the navigation information The method 900 includes determining, with the electronic processor 304, a location of a satellite (at block 904). In some examples, determining the location of the earth-based satellite terminal further includes setting a last known location of the earth-based satellite terminal as the location of the earth-based satellite terminal.

In other examples, determining the location of the satellite further includes periodically receiving an absolute location of the satellite from a satellite hub associated with the satellite, the absolute location specifying a latitude, a longitude, and a distance from the center of the Earth with respect to the satellite. In these other examples, periodically receiving the absolute location of the satellite from the satellite hub may further include periodically receiving the absolute location of the satellite from the satellite hub via the satellite transceiver and the satellite. Additionally or alternatively, in these other examples, periodically receiving the absolute location of the satellite from the satellite hub may further include periodically receiving the absolute location of the satellite from the satellite hub via a wireless interface of the earth-based satellite terminal and a terrestrial communication network.

In yet other examples, determining the location of the satellite may further include retrieving predefined information that is stored in a memory and represents a model of an approximate position of the satellite, periodically receiving a three dimensional error vector from a satellite hub, the three dimensional error vector representing an error between a present location of the satellite and a modeled position of the satellite, and determining the location of the satellite based on the three dimensional error vector and the modeled position.

In some examples, determining the location of the satellite may further include retrieving predefined information that is stored in a memory and represents a model of an approximate position of the satellite, and setting the location of the satellite based on the model of the approximate position of the satellite.

In some examples, the aforementioned predefined information is indicative of a fixed point in space. In other examples, the aforementioned predefined information is indicative of a set of points in space that form a repetitive function of time. In these other examples, the repetitive function of time may represent a figure of eight.

The method 900 includes estimating, with the electronic processor 304, a distance between the location of the earth-based satellite terminal 300 and the location of the satellite 202 (at block 906).

The method 900 includes determining, with the electronic processor 304, a Coarse Timing Advance (CTA) based on the distance that is estimated (at block 908).

The method 900 also includes controlling, with the electronic processor 304, a satellite transceiver to transmit data to the satellite 202 based on the Coarse Timing Advance and the TDMA communication protocol (at block 910). For example, the electronic processor 304 controls the satellite transceiver to transmit a RACH burst based on the CTA and the TDMA communication protocol.

Additionally, in some examples, the method 900 may further include receiving, with the electronic processor, a Fine Timing Advance from a satellite hub, wherein the Fine Timing Advance is determined by the satellite hub based on an error in an arrival time of a preamble burst sent by the earth-based satellite terminal, relative to an expected, true arrival time at the satellite. In these examples, the method 900 may further include controlling, with the electronic processor, the satellite transceiver of the earth-based satellite terminal to transmit second data burst to the satellite based on the Coarse Timing Advance, the Fine Timing Advance, and the TDMA communication protocol.

Additionally, in some examples, the method 900 may further include receiving, with the electronic processor, a Delta Timing Advance from the satellite hub, wherein the Delta Timing Advance is determined by the satellite hub based on errors in actual arrival times of uplink traffic and control channel bursts at the satellite and sent by the earth-based satellite terminal according to the TDMA communication protocol, relative to their expected, true arrival times at the satellite. In these examples, the method 900 may further include controlling, with the electronic processor, the satellite transceiver of the earth-based satellite terminal to transmit third data to the satellite based on the Coarse Timing Advance, the Fine Timing Advance, the Delta Timing Advance, and the TDMA communication protocol.

The following are enumerated examples of the devices, methods, and systems of the present disclosure for uplink synchronization in a time division multiple access (TDMA) satellite network:

Example 1: an earth-based satellite terminal comprising a satellite transceiver configured to communicate with a satellite using a time division multiple access (TDMA) communication protocol, a memory, and an electronic processor communicatively connected to the memory and the satellite transceiver, the electronic processor configured to determine a location of the earth-based satellite terminal, determine a location of the satellite, estimate a distance between the location of the earth-based satellite terminal and the location of the satellite, determine a Coarse Timing Advance based on the distance that is estimated, and control the satellite transceiver to transmit data to the satellite based on the Coarse Timing Advance and the TDMA communication protocol.

Example 2: the earth-based satellite terminal of Example 1, further comprising an input/output interface including a navigation transceiver, wherein, to determine the location of the earth-based satellite terminal, the electronic processor is configured to receive navigation information from the navigation transceiver, a terrestrial wireless navigation system, an inertial navigation system, or a combination thereof via the input/output interface, and determine the location of the earth-based satellite terminal based on the navigation information.

Example 3: the earth-based satellite terminal of any of Examples 1 or 2, wherein, to determine the location of the satellite, the electronic processor is configured to periodically receive an absolute location of the satellite from a satellite hub associated with the satellite, the absolute location specifying a latitude, a longitude, and a distance from the center of the Earth with respect to the satellite.

Example 4: the earth-based satellite terminal of Example 3, wherein the electronic processor is configured periodically receive the absolute location of the satellite from the satellite hub via the satellite transceiver and the satellite.

Example 5: the earth-based satellite terminal of Example 3, further comprising an input/output interface including a wireless interface configured to communicate with a terrestrial communication network, wherein the electronic processor is configured periodically receive the absolute location of the satellite from the satellite hub via the wireless interface and the terrestrial communication network.

Example 6: the earth-based satellite terminal of any of Examples 1-5, wherein, to determine the location of the satellite, the electronic processor is configured to retrieve predefined information that is stored in the memory and represents a model of an approximate position of the satellite, periodically receive a three dimensional error vector from a satellite hub, the three dimensional error vector representing an error between a present location of the satellite and a modeled position of the satellite, and determine the location of the satellite based on the three dimensional error vector and the modeled position.

Example 7: the earth-based satellite terminal of Example 6, where the predefined information is indicative of a fixed point in space.

Example 8: the earth-based satellite terminal of Example 6, where the predefined information is indicative of a set of points in space that form a repetitive function of time.

Example 9: the earth-based satellite terminal of Example 8, where the repetitive function of time represents a figure of eight.

Example 10: the earth-based satellite terminal of any of Examples 1-9, wherein, to determine the location of the satellite, the electronic processor is configured to retrieve predefined information that is stored in the memory and represents a model of an approximate position of the satellite, and set the location of the satellite based on the model of the approximate position of the satellite.

Example 11: the earth-based satellite terminal of any of Examples 1-10, wherein the electronic processor is further configured to receive a Fine Timing Advance from a satellite hub, wherein the Fine Timing Advance is determined by the satellite hub based on an error in an arrival time of a preamble burst sent by the earth-based satellite terminal, relative to an expected, true arrival time at the satellite, and control the satellite transceiver to transmit second data to the satellite based on the Coarse Timing Advance, the Fine Timing Advance, and the TDMA communication protocol.

Example 12: the earth-based satellite terminal of Example 11, wherein the electronic processor is further configured to receive a Delta Timing Advance from the satellite hub, wherein the Delta Timing Advance is determined by the satellite hub based on errors in actual arrival times of uplink traffic and control channel bursts at the satellite and sent by the earth-based satellite terminal according to the TDMA communication protocol, relative to their expected, true arrival times at the satellite, and control the satellite transceiver to transmit third data to the satellite based on the Coarse Timing Advance, the Fine Timing Advance, the Delta Timing Advance, and the TDMA communication protocol.

Example 13: a wireless communication method comprising determining, with an electronic processor of an earth-based satellite terminal, a location of the earth-based satellite terminal; determining, with the electronic processor, a location of a satellite; estimating, with the electronic processor, a distance between the location of the earth-based satellite terminal and the location of the satellite; determining, with the electronic processor, a Coarse Timing Advance based on the distance that is estimated; and controlling, with the electronic processor, a satellite transceiver of the earth-based satellite terminal to transmit data to the satellite based on the Coarse Timing Advance and a time division multiple access (TDMA) communication protocol.

Example 14: the wireless communication method of Example 13, wherein determining the location of the earth-based satellite terminal further includes receiving navigation information from a navigation transceiver, a terrestrial wireless navigation system, an inertial navigation system, or a combination thereof via an input/output interface of the earth-based satellite terminal; and determining the location of the earth-based satellite terminal based on the navigation information.

Example 15: the wireless communication method of any of Examples 13 and 14, wherein determining the location of the earth-based satellite terminal further includes setting a last known location of the earth-based satellite terminal as the location of the earth-based satellite terminal.

Example 16: the wireless communication method of any of Examples 13-15, wherein determining the location of the satellite further includes periodically receiving an absolute location of the satellite from a satellite hub associated with the satellite, the absolute location specifying a latitude, a longitude, and a distance from the center of the Earth with respect to the satellite.

Example 17: the wireless communication method of Example 16, wherein periodically receiving the absolute location of the satellite from the satellite hub further includes periodically receiving the absolute location of the satellite from the satellite hub via the satellite transceiver and the satellite.

Example 18: the wireless communication method of Example 16, wherein periodically receiving the absolute location of the satellite from the satellite hub further includes periodically receiving the absolute location of the satellite from the satellite hub via a wireless interface of the earth-based satellite terminal and a terrestrial communication network.

Example 19: the wireless communication method of any of Examples 13-18, wherein determining the location of the satellite further includes retrieving predefined information that is stored in a memory and represents a model of an approximate position of the satellite; periodically receiving a three dimensional error vector from a satellite hub, the three dimensional error vector representing an error between a present location of the satellite and a modeled position of the satellite; and determining the location of the satellite based on the three dimensional error vector and the modeled position.

Example 20: the wireless communication method of any of Examples 13-19, wherein determining the location of the satellite further includes retrieving predefined information that is stored in a memory and represents a model of an approximate position of the satellite; and setting the location of the satellite based on the model of the approximate position of the satellite.

Example 21: the wireless communication method of any of Examples 13-20, further comprising receiving, with the electronic processor, a Fine Timing Advance from a satellite hub, wherein the Fine Timing Advance is determined by the satellite hub based on an error in an arrival time of a preamble burst sent by the earth-based satellite terminal, relative to an expected, true arrival time at the satellite; and controlling, with the electronic processor, the satellite transceiver of the earth-based satellite terminal to transmit second data to the satellite based on the Coarse Timing Advance, the Fine Timing Advance, and the TDMA communication protocol.

Example 22: the wireless communication method of Example 21, further comprising receiving, with the electronic processor, a Delta Timing Advance from the satellite hub, wherein the Delta Timing Advance is determined by the satellite hub based on errors in actual arrival times of uplink traffic and control channel bursts at the satellite and sent by the earth-based satellite terminal according to the TDMA communication protocol, relative to their expected, true arrival times; and controlling, with the electronic processor, the satellite transceiver of the earth-based satellite terminal to transmit third data to the satellite based on the Coarse Timing Advance, the Fine Timing Advance, the Delta Timing Advance, and the TDMA communication protocol.

Example 23: a time division multiple access (TDMA) communication system comprising a satellite; and an earth-based satellite terminal including a satellite transceiver configured to communicate with the satellite using the TDMA communication protocol, a memory, and an electronic processor communicatively connected to the memory and the satellite transceiver, the electronic processor configured to determine a location of the earth-based satellite terminal, determine a location of the satellite, estimate a distance between the location of the earth-based satellite terminal and the location of the satellite, determine a Coarse Timing Advance based on the distance that is estimated, and control the satellite transceiver to transmit data to the satellite based on the Coarse Timing Advance and the TDMA communication protocol.

Example 24: the time division multiple access (TDMA) communication system of Example 23, further comprising a satellite hub communicatively coupled to the satellite and configured to determine a Fine Timing Advance based on an error in an arrival time of a preamble burst sent by the earth-based satellite terminal, relative to an expected, true arrival time at the satellite, and transmit the Fine Timing Advance to the earth-based satellite terminal, wherein the electronic processor is further configured to receive the Fine Timing Advance from the satellite hub, and control the satellite transceiver to transmit second data to the satellite based on the Coarse Timing Advance, the Fine Timing Advance, and the TDMA communication protocol.

Example 25: the time division multiple access (TDMA) communication system of Example 24, wherein the satellite hub is further configured to determine a Delta Timing Advance based on errors in actual arrival times of uplink traffic and control channel bursts at the satellite and sent by the earth-based satellite terminal according to the TDMA communication protocol, relative to their expected, true arrival times at the satellite, and transmit the Delta Timing Advance to the earth-based satellite terminal, and wherein the electronic processor is further configured to receive the Delta Timing Advance from the satellite hub, and control the satellite transceiver to transmit third data to the satellite based on the Coarse Timing Advance, the Fine Timing Advance, the Delta Timing Advance, and the TDMA communication protocol.

Thus, the present disclosure provides, among other things, devices, methods, and systems for uplink synchronization in a time division multiple access (TDMA) satellite network. Various features and advantages of the present disclosure are set forth in the following claims.

What is claimed is:

1. An earth-based satellite terminal comprising:
    a satellite transceiver configured to communicate with a satellite using a time division multiple access (TDMA) communication protocol,
    a memory, and
    an electronic processor communicatively connected to the memory and the satellite transceiver, the electronic processor configured to
        determine a location of the earth-based satellite terminal,
        determine a location of the satellite,
        estimate a distance between the location of the earth-based satellite terminal and the location of the satellite,
        determine a Coarse Timing Advance based on the distance that is estimated,
        control the satellite transceiver to transmit data to the satellite based on the Coarse Timing Advance and the TDMA communication protocol,
        receive a Fine Timing Advance from a satellite hub, wherein the Fine Timing Advance is determined by the satellite hub based on an error in an arrival time of a preamble burst sent by the earth-based satellite terminal, relative to an expected, true arrival time at the satellite, and
        control the satellite transceiver to transmit second data to the satellite based on the Coarse Timing Advance, the Fine Timing Advance, and the TDMA communication protocol.

2. The earth-based satellite terminal of claim 1, further comprising:
    an input/output interface including a navigation transceiver,
    wherein, to determine the location of the earth-based satellite terminal, the electronic processor is configured to
        receive navigation information from the navigation transceiver, a terrestrial wireless navigation system, an inertial navigation system, or a combination thereof via the input/output interface, and
        determine the location of the earth-based satellite terminal based on the navigation information.

3. The earth-based satellite terminal of claim 1, wherein, to determine the location of the satellite, the electronic processor is configured to periodically receive an absolute location of the satellite from the satellite hub associated with the satellite, the absolute location specifying a latitude, a longitude, and a distance from the center of the Earth with respect to the satellite.

4. The earth-based satellite terminal of claim 3, wherein the electronic processor is configured to periodically receive the absolute location of the satellite from the satellite hub via the satellite transceiver and the satellite.

5. The earth-based satellite terminal of claim 3, further comprising:
    an input/output interface including a wireless interface configured to communicate with a terrestrial communication network,
    wherein the electronic processor is configured to periodically receive the absolute location of the satellite from the satellite hub via the wireless interface and the terrestrial communication network.

6. The earth-based satellite terminal of claim 1, wherein, to determine the location of the satellite, the electronic processor is configured to
    retrieve predefined information that is stored in the memory and represents a model of an approximate position of the satellite,
    periodically receive a three dimensional error vector from the satellite hub, the three dimensional error vector representing an error between a present location of the satellite and a modeled position of the satellite, and
    determine the location of the satellite based on the three dimensional error vector and the modeled position.

7. The earth-based satellite terminal of claim 6, where the predefined information is indicative of a fixed point in space.

8. The earth-based satellite terminal of claim 6, where the predefined information is indicative of a set of points in space that form a repetitive function of time.

9. The earth-based satellite terminal of claim 8, where the repetitive function of time represents a figure of eight.

10. The earth-based satellite terminal of claim 1, wherein, to determine the location of the satellite, the electronic processor is configured to
retrieve predefined information that is stored in the memory and represents a model of an approximate position of the satellite, and
set the location of the satellite based on the model of the approximate position of the satellite.

11. The earth-based satellite terminal of claim 1, wherein the electronic processor is further configured to
receive a Delta Timing Advance from the satellite hub, wherein the Delta Timing Advance is determined by the satellite hub based on errors in actual arrival times of uplink traffic and control channel bursts at the satellite and sent by the earth-based satellite terminal according to the TDMA communication protocol, relative to their expected, true arrival times at the satellite, and
control the satellite transceiver to transmit third data to the satellite based on the Coarse Timing Advance, the Fine Timing Advance, the Delta Timing Advance, and the TDMA communication protocol.

12. A wireless communication method comprising:
determining, with an electronic processor of an earth-based satellite terminal, a location of the earth-based satellite terminal;
determining, with the electronic processor, a location of a satellite;
estimating, with the electronic processor, a distance between the location of the earth-based satellite terminal and the location of the satellite;
determining, with the electronic processor, a Coarse Timing Advance based on the distance that is estimated;
controlling, with the electronic processor, a satellite transceiver of the earth-based satellite terminal to transmit data to the satellite based on the Coarse Timing Advance and a time division multiple access (TDMA) communication protocol;
receiving, with the electronic processor, a Fine Timing Advance from a satellite hub, wherein the Fine Timing Advance is determined by the satellite hub based on an error in an arrival time of a preamble burst sent by the earth-based satellite terminal, relative to an expected, true arrival time at the satellite; and
controlling, with the electronic processor, the satellite transceiver of the earth-based satellite terminal to transmit second data to the satellite based on the Coarse Timing Advance, the Fine Timing Advance, and the TDMA communication protocol.

13. The wireless communication method of claim 12, wherein determining the location of the earth-based satellite terminal further includes
receiving navigation information from a navigation transceiver, a terrestrial wireless navigation system, an inertial navigation system, or a combination thereof via an input/output interface of the earth-based satellite terminal; and
determining the location of the earth-based satellite terminal based on the navigation information.

14. The wireless communication method of claim 12, wherein determining the location of the earth-based satellite terminal further includes setting a last known location of the earth-based satellite terminal as the location of the earth-based satellite terminal.

15. The wireless communication method of claim 12, wherein determining the location of the satellite further includes periodically receiving an absolute location of the satellite from the satellite hub associated with the satellite, the absolute location specifying a latitude, a longitude, and a distance from the center of the Earth with respect to the satellite.

16. The wireless communication method of claim 15, wherein periodically receiving the absolute location of the satellite from the satellite hub further includes periodically receiving the absolute location of the satellite from the satellite hub via the satellite transceiver and the satellite.

17. The wireless communication method of claim 15, wherein periodically receiving the absolute location of the satellite from the satellite hub further includes periodically receiving the absolute location of the satellite from the satellite hub via a wireless interface of the earth-based satellite terminal and a terrestrial communication network.

18. The wireless communication method of claim 12, wherein determining the location of the satellite further includes
retrieving predefined information that is stored in a memory and represents a model of an approximate position of the satellite;
periodically receiving a three dimensional error vector from the satellite hub, the three dimensional error vector representing an error between a present location of the satellite and a modeled position of the satellite; and
determining the location of the satellite based on the three dimensional error vector and the modeled position.

19. The wireless communication method of claim 12, wherein determining the location of the satellite further includes
retrieving predefined information that is stored in a memory and represents a model of an approximate position of the satellite; and
setting the location of the satellite based on the model of the approximate position of the satellite.

20. A wireless communication method comprising:
determining, with an electronic processor of an earth-based satellite terminal, a location of the earth-based satellite terminal;
determining, with the electronic processor, a location of a satellite;
estimating, with the electronic processor, a distance between the location of the earth-based satellite terminal and the location of the satellite;
determining, with the electronic processor, a Coarse Timing Advance based on the distance that is estimated;
receiving, with the electronic processor, a Fine Timing Advance from a satellite hub, wherein the Fine Timing Advance is determined by the satellite hub based on an error in an arrival time of a preamble burst sent by the earth-based satellite terminal, relative to an expected, true arrival time at the satellite; and
controlling, with the electronic processor, a satellite transceiver of the earth-based satellite terminal to transmit data to the satellite based on the Coarse Timing Advance, the Fine Timing Advance, and a time division multiple access (TDMA) communication protocol.

21. The wireless communication method of claim 20, further comprising:
receiving, with the electronic processor, a Delta Timing Advance from the satellite hub, wherein the Delta Timing Advance is determined by the satellite hub based on errors in actual arrival times of uplink traffic and control channel bursts at the satellite and sent by the earth-based satellite terminal according to the TDMA communication protocol, relative to their expected, true arrival times; and controlling, with the electronic processor, the satellite transceiver of the earth-based satellite terminal to transmit third data to the satellite based on the Coarse Timing Advance, the Fine Timing Advance, the Delta Timing Advance, and the TDMA communication protocol.

22. A time division multiple access (TDMA) communication system comprising:
a satellite; and
an earth-based satellite terminal including
  a satellite transceiver configured to communicate with the satellite using the TDMA communication protocol,
  a memory, and
  an electronic processor communicatively connected to the memory and the satellite transceiver, the electronic processor configured to
    determine a location of the earth-based satellite terminal,
    determine a location of the satellite,
    estimate a distance between the location of the earth-based satellite terminal and the location of the satellite,
    determine a Coarse Timing Advance based on the distance that is estimated, and
    control the satellite transceiver to transmit data to the satellite based on the Coarse Timing Advance and a time division multiple access (TDMA) communication protocol; and
a satellite hub communicatively coupled to the satellite and configured to
  determine a Fine Timing Advance based on an error in an arrival time of a preamble burst sent by the earth-based satellite terminal, relative to an expected, true arrival time at the satellite, and
  transmit the Fine Timing Advance to the earth-based satellite terminal,
wherein the electronic processor is further configured to
  receive the Fine Timing Advance from the satellite hub, and
    control the satellite transceiver to transmit second data to the satellite based on the Coarse Timing Advance, the Fine Timing Advance, and the TDMA communication protocol.

23. The time division multiple access (TDMA) communication system of claim 22, wherein the satellite hub is further configured to
  determine a Delta Timing Advance based on errors in actual arrival times of uplink traffic and control channel bursts at the satellite and sent by the earth-based satellite terminal according to the TDMA communication protocol, relative to their expected, true arrival times at the satellite, and
  transmit the Delta Timing Advance to the earth-based satellite terminal, and wherein the electronic processor is further configured to
  receive the Delta Timing Advance from the satellite hub, and
  control the satellite transceiver to transmit third data to the satellite based on the Coarse Timing Advance, the Fine Timing Advance, the Delta Timing Advance, and the TDMA communication protocol.

* * * * *